(12) United States Patent
Hubbard et al.

(10) Patent No.: US 6,289,072 B1
(45) Date of Patent: Sep. 11, 2001

(54) NEAR-ZERO SPEED ESTIMATION METHOD FOR A PULSE COUNTING SPEED CALCULATION

(75) Inventors: Gregory A Hubbard, Carmel; Jeffrey Kurt Runde, Fishers, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/517,102

(22) Filed: Mar. 7, 2000

(51) Int. Cl.$^7$ ........................................ G07C 3/00

(52) U.S. Cl. .............................. 377/20; 377/23

(58) Field of Search .................. 377/20, 23, 24.1, 377/15, 17

(56) References Cited

U.S. PATENT DOCUMENTS

| | | | | |
|---|---|---|---|---|
| 4,890,231 | * | 12/1989 | Frantz | 701/97 |
| 5,117,698 | * | 6/1992 | Baumoel | 73/861.28 |
| 5,157,461 | * | 10/1992 | Page | 356/462 |

* cited by examiner

*Primary Examiner*—Tuan T. Lam
(74) *Attorney, Agent, or Firm*—Laura C. Hargitt

(57) ABSTRACT

An improved speed indication method for a sensor that develops one or more electrical pulses per unit movement of a movable part, wherein the indicated speed is based on the number of speed pulses generated per unit time, but is constrained by a limit function based on the time elapsed without the generation of a speed pulse. When the pulse generation rate falls below the update rate of the speed indication, a maximum possible speed based on the duration of the "no pulse interval" is computed, and the indicated speed is reduced based on the computed maximum. When the next pulse occurs, the speed indication is updated based on the lower of a new speed calculation and the computed maximum speed. If speed pulses continue to be received, the computed maximum is no longer used as a limit, and the speed indication is updated in accordance with the pulse based speed calculation. As a result, the indicated speed provides a smoothly varying and more accurate representation of the shaft speed at very low speeds, enabling more accurate low speed control.

5 Claims, 1 Drawing Sheet

NEAR-ZERO SPEED ESTIMATION METHOD FOR A PULSE COUNTING SPEED CALCULATION

TECHNICAL FIELD

This invention relates to a method of computing speed with a sensor that develops one or more electrical pulses per unit movement of a device such as a rotary shaft, and more particularly to a method for estimating very low speeds of the device.

BACKGROUND OF THE INVENTION

One very common and relatively inexpensive technique for measuring the speed of a moving part is to produce electrical pulses in synchronism with movement of the part and to count the number of pulses produced per unit interval of time. For example, a variable reluctance sensor may be mounted relative to a rotary shaft for producing a pulse each time a gear tooth or notch formed on the shaft passes the sensor. The pulses may be applied to a control circuit (which may include a microprocessor) that counts the pulses and maintains a record of the time at which each pulse is received. In such case, the speed of the shaft (in revolutions per second, for example) can be computed as a simple function of the counter value, the time elapsed between the first and last pulses of the stored count, and number of pulses produced per revolution of the shaft. For the sake of convenience, the speed calculation is usually repeated at a known update rate, as may be defined, for example, by the loop time of a microprocessor-based controller. In other words, the controller periodically executes a software routine that checks the counter value and computes a new speed value. A limitation of this technique occurs when the speed of the shaft is so low that the pulse frequency is lower than the update frequency; that is, when no pulses have been received since the previous speed calculation. At such point, there is insufficient information to update the calculated speed, although it can be deduced that the previously calculated value is no longer correct.

When the calculated speed is used for control purposes, the above-described limitation also limits the ability to perform any control function based on the calculated speed. For example, when the speed of a vehicle engine or transmission is calculated and used in a control strategy to engage a transmission clutch, it becomes difficult or impossible for the control strategy to achieve high shift quality at low vehicle speeds.

Known techniques for handling the above-described low speed limitation include simply holding the value of the previous speed calculation until the next pulse is received, or assuming that the speed is zero and ramping the indicated speed to zero using a first order filtering technique. However, these approaches are inadequate for control purposes where accurate low speed information is important. In the transmission shift control application, for example, certain shifts occur at very low speeds, such as when shifting between forward and reverse speed ranges, and high shift quality is difficult to achieve when the above-mentioned techniques are used to estimate speed.

Accordingly, what is needed is a speed estimation method that develops a more accurate low speed indication from an inexpensive pulse-type sensor.

SUMMARY OF THE INVENTION

This invention is directed to an improved speed indication method for a sensor that develops one or more electrical pulses per unit movement of a movable part, wherein the indicated speed is updated based on the number of speed pulses generated per unit time, but is constrained by a limit function based on the time elapsed without the generation of a speed pulse. The indicated speed is updated in accordance with a first methodology when at least one pulse has been generated since the last update, and in accordance with a second methodology when no pulses have been produced since the last update. In the first methodology, a speed is computed based on a count of the produced pulses and a time interval spanning the production of the counted pulses, and the indicated speed is updated in accordance with the computed speed. In the second methodology, a speed bound is computed based on a no-pulse interval during which no pulses have been produced, assuming that a pulse is produced when the speed bound is computed, and the indicated speed is updated in accordance with the lower of the computed speed bound and the indicated speed as previously updated. The number of successive updates of the indicated speed with no pulses being produced by the sensor is counted, and the indicated speed is set to zero when the count reaches a threshold. When one or more pulses are produced after a period of no pulses, the first methodology updates the indicated speed in accordance with the lower of the computed speed and the computed speed bound, providing a transition from the second methodology to the first methodology. As a result, the indicated speed provides a smoothly varying and more accurate representation of the speed of the part at very low speeds, enabling more accurate low speed control.

DESCRIPTION OF THE PREFERRED EMBODIMENT

Figure 1:
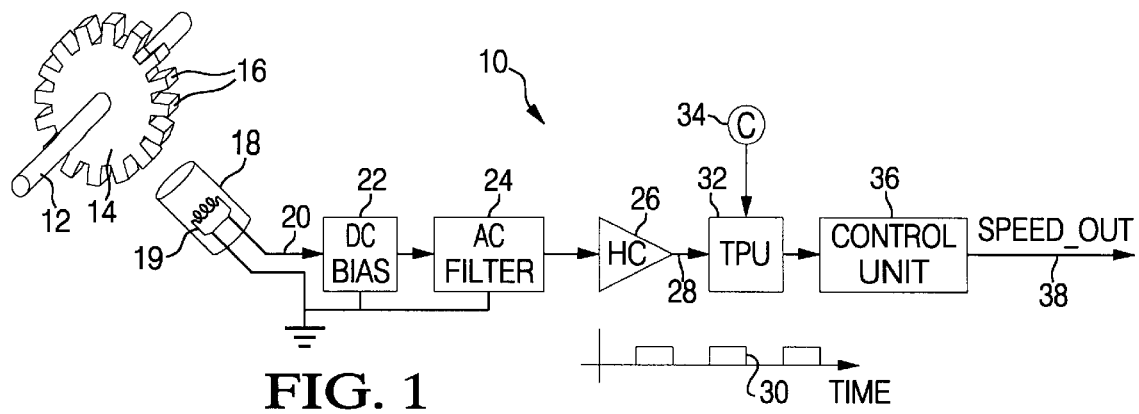
FIG. 1 is a diagram of a pulse sensor and control circuit including a microprocessor-based control unit for estimating the speed of a rotating shaft according to this invention.

Referring to FIG. 1, the reference numeral 10 generally designates an apparatus for indicating the speed of a rotary shaft 12. The shaft 12 is fitted with a disc 14 having a number of teeth 16, which may be gear teeth, for example, and a sensor 18, which may be a variable reluctance sensor, is positioned to detect the passage of the teeth 16 as the shaft 12 and disc 14 rotate. With each passage of a tooth 16, the magnetic field strength in the vicinity of a sensor coil 19 fluctuates, producing a quasi-sinusoidal electrical signal on the un-grounded sensor output line 20. The signal on line 20 is applied to a signal conditioning circuit including a DC bias circuit 22, an AC filter 24 and a hysteresis comparator 26. The DC bias circuit 22 shifts the average voltage of the sensor signal to a predetermined DC value, the AC filter 24 attenuates high frequency noise, and the hysteresis comparator 26 compares the biased and filtered signal to a pair of threshold voltages to form a digital pulse-train on line 28, as represented by the waveform 30. The digital pulses, referred to herein as speed pulses, are applied to a timer processor unit (TPU) 32, which detects an edge (rising or falling) of each speed pulse, counts the number of detected pulses, and records a time of the clock 34 corresponding to each detected edge. The pulse information developed by TPU 32 is applied to a microprocessor-based control unit 36, which periodically executes a speed calculation routine that uses the information to determine the speed of shaft 12, and if desired, to provide a corresponding output indication (SPEED_OUT) on line 38. Additionally, the speed indication SPEED_OUT may be used by control unit 36 for control purposes—for example, for controlling a motor (not shown) mechanically coupled to the shaft 12.

In general, the control unit 36 determines the calculated shaft speed (referred to herein as SPEED_CALC) by dividing the number of pulses received by the elapsed time, and multiplying the result by a predetermined factor based on the number of teeth 16 and a time conversion constant. The elapsed time is preferably based on clock information recorded by the TPU 32; for example, the difference between the times associated with the last received pulses in successive executions of the speed calculation routine. The apparatus is designed so that at most shaft speeds, at least a minimum number of pulses will be generated between successive executions of the speed calculation routine. However, when the shaft speed falls below a certain value (which may be near-zero), no pulses will be generated between successive executions of the speed calculation routine. In other words, the pulse generation rate will fall below the update rate of the speed indication SPEED_OUT. When this happens, the routine cannot directly calculate the shaft speed, but instead calculates a speed bound (referred to herein as BOUND_CALC) representing the maximum possible speed based on the duration of the "no pulse interval", and reduces the indicated speed SPEED_OUT based on the calculated bound. When the next pulse occurs, SPEED_OUT is updated based on the lower of SPEED_CALC and BOUND_CALC. If speed pulses continue to be received between successive executions of the routine, BOUND_CALC is no longer used as a limit, and SPEED_OUT is updated in accordance with SPEED_CALC. As a result, the indicated speed (SPEED_OUT) provides a smoothly varying and more accurate representation of the shaft speed at very low speeds, enabling more accurate low speed control of the shaft or its drive source, if desired.

Figure 2:
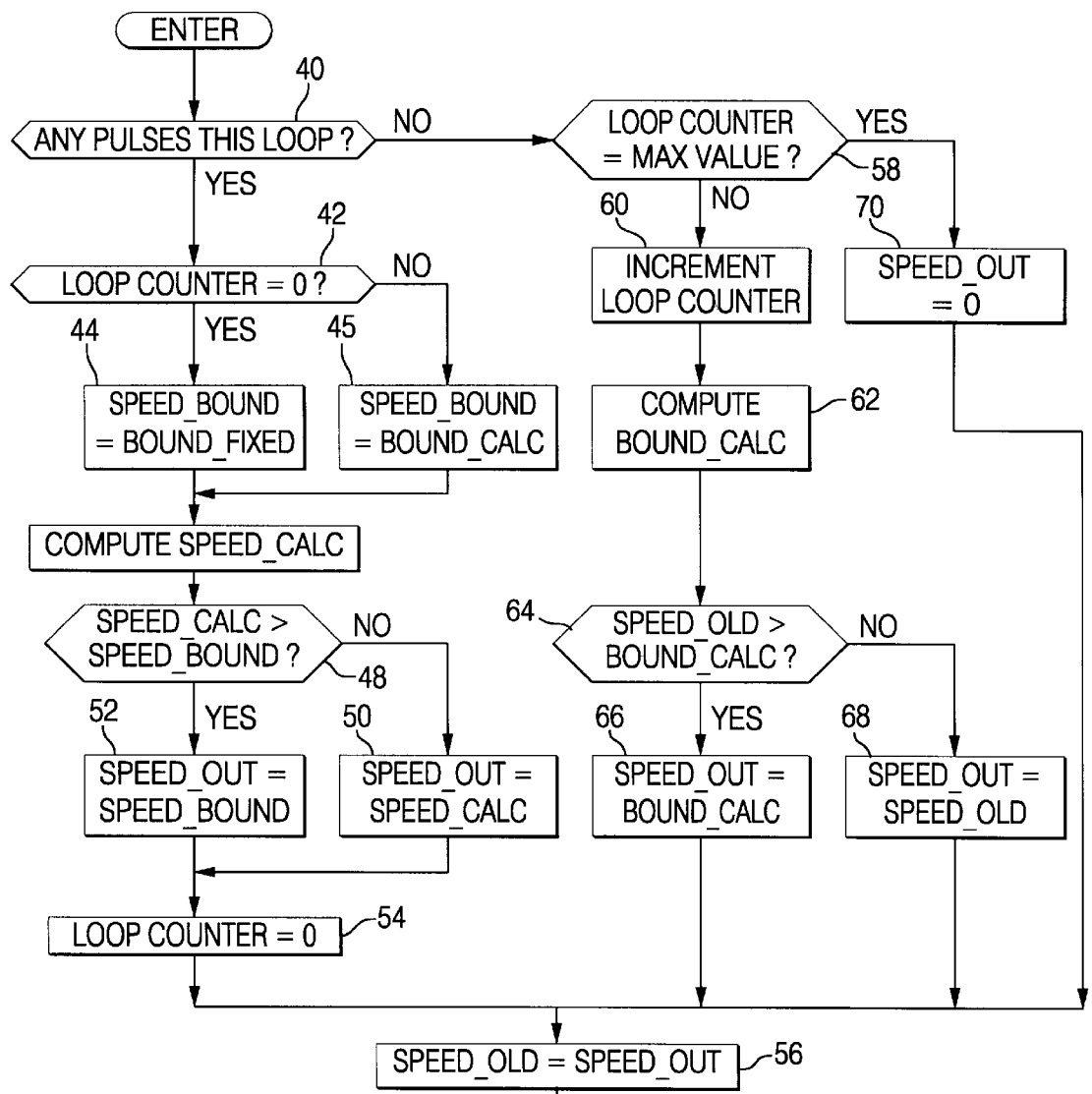
FIG. 2 is a flow diagram representative of computer program instructions executed by the control unit of FIG. 1 according to this invention.

FIG. 2 is a flow diagram representative of computer program instructions executed by the control unit 36 in carrying out the aboved-described method. At each execution of the routine, the block 40 determines if any speed pulses have been received since the last update of SPEED_OUT. If so, the blocks 42–56 are executed to update SPEED_OUT according to a first methodology. If not, the blocks 58–70 and 56 are executed to update SPEED_OUT according to a second methodology.

In the first methodology, block 42 determines if a pulse was received in the previous execution of the routine, based on the count stored in LOOP COUNTER. Initially, the counter value is zero, and the block 44 sets the shaft speed limit, SPEED_BOUND, to a fixed value (BOUND_FIXED) representing a maximum value that can be computed based on the bit length used in the speed calculation. The block 46 then generates a calculated shaft speed SPEED_CALC; as explained above, this involves dividing the number of pulses received since the previous execution of the routine by the elapsed time, and multiplying the result by a predetermined factor based on the number of teeth 16 and a time conversion constant. If SPEED_CALC is less than or equal to SPEED_BOUND, as determined at block 48, the block 50 sets SPEED_OUT equal to SPEED_CALC; otherwise, block 52 sets SPEED_OUT equal to the limit SPEED_BOUND. Finally, the blocks 54 and 56 are executed to set LOOP COUNTER to zero and to store the current value of SPEED_OUT as SPEED_OLD for possible use in the next execution of the routine.

In the second methodology, block 58 determines if the count stored in LOOP COUNTER, which stores the number of successive loops (routine executions) for which no speed pulses have been received, has reached a maximum value, MAX VALUE. If not, block 60 increments LOOP COUNTER. Then block 62 calculates the value of BOUND_CALC, a limit representing the maximum possible speed of shaft 12 based on the duration of the "no pulse interval"; that is, assuming that a pulse is received at the time of the calculation. In other words, the number of pulses in the speed calculation is set equal to one, and the time used in the speed calculation is determined according to the difference between the timer clock value for the last received pulse and the current timer clock value. If the previous value of SPEED_OUT (that is, SPEED_OLD) is greater than BOUND_CALC, as determined at block 64, block 66 sets SPEED_OUT equal to BOUND_CALC; otherwise, block 68 maintains SPEED_OUT at its old value, SPEED_OLD. Block 56 then stores the current value of SPEED_OUT as SPEED_OLD, completing the routine.

If no speed pulses are received for two or more successive executions of the speed update routine, SPEED_OUT will be successively updated in accordance with block 62, decreasing asymptotically toward zero. If the LOOP COUNTER is successively incremented up to the maximum value (MAX VALUE) due to no speed pulses being received for an extended period, the block 58 is answered in the affirmative. In such case, blocks 60–68 are skipped, and block 70 is executed to set SPEED_OUT equal to zero. In a similar vein, it will also be recognized that if a secondary input to control unit 36 indicates that the shaft speed is zero, the control unit 36 may utilize such information by immediately setting the LOOP COUNTER to MAX VALUE so that in the absence of further speed pulses, SPEED_OUT will also indicate zero speed.

Once a speed pulse is received following a period with no speed pulses, the block 40 is answered in the affirmative, and the block 42 is answered in the negative. In such case, block 44 is skipped, and block 45 is executed to set SPEED_BOUND equal to BOUND_CALC, thereby limiting SPEED_OUT to the lower of BOUND_CALC and the SPEED_CALC value computed at block 46. If speed pulses continue to be received, block 42 will be answered in the affirmative, and BOUND_CALC will no longer be used to limit SPEED$_{13}$ OUT.

In the manner described above, the speed estimation method of this invention continues to update the speed indication SPEED_OUT even in the absence of speed pulses, and the resulting speed indication is maintained as accurate as possible by constraining its value in accordance with a limit function based on the time elapsed without the generation of a speed pulse. The result is a more accurate and reliable speed indication, which can be of particular benefit to low speed control applications carried out by the control unit 36. While described in reference to the illustrated embodiments, it is expected that various modifications in addition to those mentioned above will occur to those skilled in the art. For example, the speed pulses may be developed with a variety of different sensor mechanisms, including without limitation, optical, mechanical or magnetic sensors. Accordingly, it will be understood that methods incorporating these and other modifications may fall within the scope of this invention, which is defined by the appended claims.

What is claimed is:

1. A method of periodically updating an indicated speed of a movable part based on pulses produced by a speed sensor in response to movement of the part, the method comprising the steps of:

updating the indicated speed in accordance with a first methodology if one or more pulses were produced by said sensor since a previous updating of the indicated speed, wherein a speed is computed based on a count of the produced pulses and a time interval spanning the production of the counted pulses, and the indicated speed is updated in accordance with the computed speed; and updating the indicated speed in accordance with a second methodology if no pulses were produced by said sensor since a previous updating of the indicated speed, wherein a speed bound is computed based on a no-pulse interval during which no pulses have been produced, assuming that a pulse is produced when said speed bound is computed, and the indicated speed is updated in accordance with the lower of the computed speed bound and the indicated speed as previously updated.

2. The method of claim 1, wherein said second methodology includes the steps of:

counting a number of successive updates of the indicated speed with no pulses being produced by said sensor; and setting the indicated speed to zero when the counted number of successive updates reaches a threshold.

3. The method of claim 1, wherein said first methodology includes the steps of:

updating the indicated speed in accordance with the lower of the computed speed and the computed speed bound if the indicated speed was previously updated in accordance with the second methodology.

4. The method of claim 1, wherein:

the first methodology resets a counter; and the second methodology increments the counter, and sets the indicated speed to zero when the counter reaches a threshold.

5. The method of claim 1, wherein:

the second methodology increments a counter; and the first methodology updates the indicated speed in accordance with the lower of the computed speed and the computed speed bound if the counter has been incremented, and then resets the counter.

* * * * *